Aug. 9, 1955     I. JEPSON     2,714,763
SHEARING HANDPIECE
Filed May 8, 1952     2 Sheets-Sheet 1
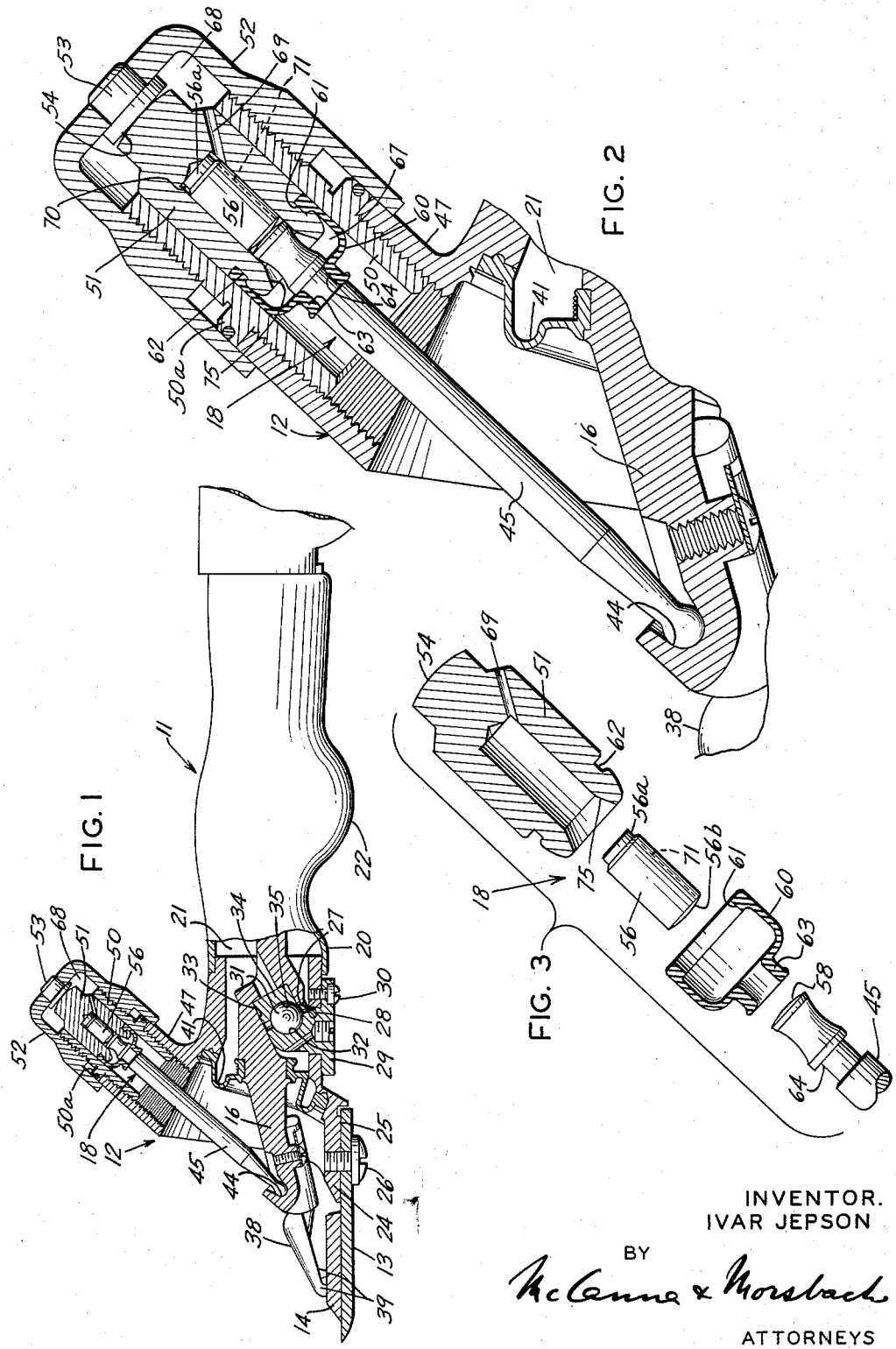
INVENTOR.
IVAR JEPSON
BY
McCanna & Morsbach
ATTORNEYS Aug. 9, 1955        I. JEPSON        2,714,763
SHEARING HANDPIECE
Filed May 8, 1952        2 Sheets-Sheet 2
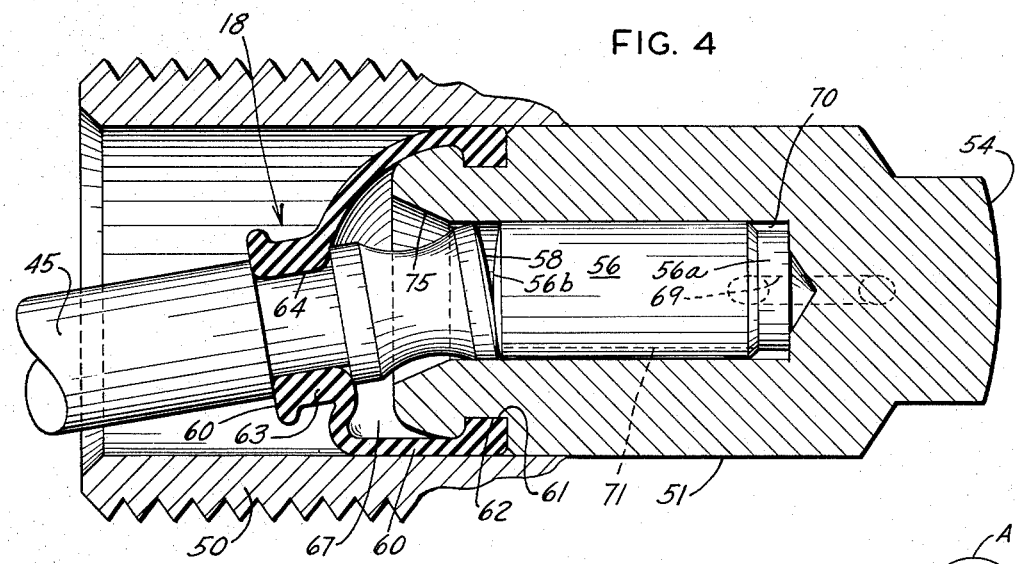
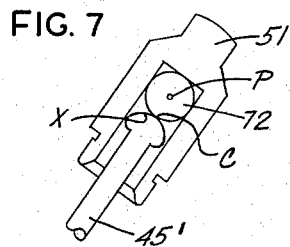
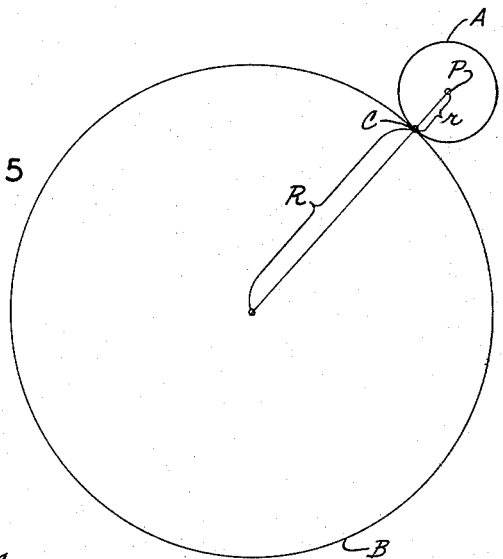
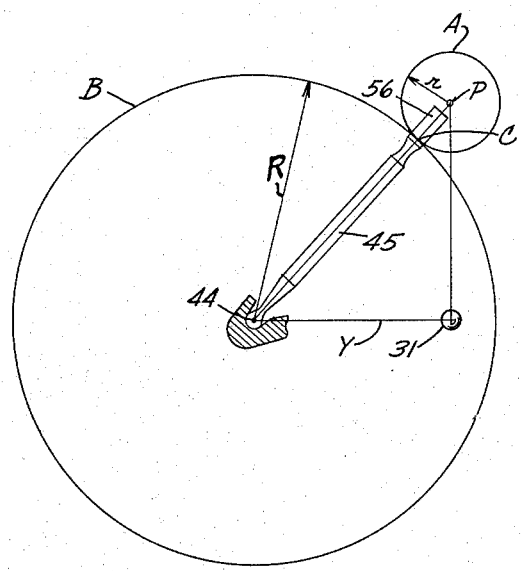
INVENTOR
IVAR JEPSON
BY
ATTORNEYS

2,714,763

SHEARING HANDPIECE

Ivar Jepson, Oak Park, Ill., assignor to Sunbeam Corporation, Chicago, Ill., a corporation of Illinois Application May 8, 1952, Serial No. 286,681

5 Claims. (Cl. 30—221)

The present invention relates to shearing handpieces, and more particularly to an improved means for applying pressure between the comb and cutter of the shearing handpiece used for shearing sheep and the like. Specifically, the present invention is an improvement on copending Bartlett application Serial No. 168,127, filed June 14, 1950, now Patent No. 2,651,107, granted September 8, 1953, and assigned to the same assignee as the present application.

As was pointed out in the above referred to copending application, shearing handpieces are subject to very severe treatment during use. In the first place, the fleece of a sheep contains a large amount of oil, together with dirt and other foreign matter, and obviously the combination of the foreign matter and oil has a very deleterious effect on the bearing surfaces and the like of the handpiece, which of course are present in power operated sheep shearing equipment. Moreover, such shearing handpieces are subject to unusually hard usage during the sheep shearing seasons. Also such shearing handpieces must be capable of withstanding the very severe use to which they are put by custom shearers occasioned by competition during these periods as well as that in sheep shearing contests and still must give complete and satisfactory results. Conventional shearing handpieces have for quite some time employed a pivotally mounted driving fork or member having one end connected to a crank or other means for converting rotary motion from a suitable prime mover to oscillating movement of the cutter. Such shearing handpieces are disclosed, for example, in United States Letters Patent No. 2,296,230, Brookes, and No. 2,296,236, Musolf, both assigned to the same assignee as the present application. In order to provide the desired force biasing the cutter and comb into shearing engagement for satisfactory shearing operation, it is customary to provide adjustable means for varying the force applied between the cutter and the comb. This force is conventionally applied through an elongated pin engaging the fork at a point intermediate the connection with the cutter and the pivot for the fork. For best shearing operation it has been found that a certain predetermined pressure is desired between the cutter and the comb, and the improved construction of the copending Bartlett application provides an arrangement of a shearing handpiece having greatly increased life and more satisfactory operation relative to prior shearing handpieces.

The improved shearing handpiece disclosed in the above-mentioned copending Bartlett application has gone a long way in preventing the entry of dust, dirt and other foreign matter into the handpiece. This has been accomplished to some extent at the expense of air circulation, since foreign matter, such as dust and the like, enters the shearing handpiece with the circulating air. It has been found that some users of such shearing handpieces desire to apply a felt or other cover on the outside of the handle which tends to reduce the heat transfer with the possibility of increased heating of the device, requiring the reduction of friction to a minimum wherever possible. One of the prime sources of friction in shearing handpieces employed heretofore has been in connection with the so-called tension pin which applies the force to the cutter to cause it to move in shearing engagement with the comb. Since a substantial force must be applied through the tension pin, the friction not only causes substantial heating but also wear of the surfaces in frictional engagement. It would be desirable, therefore, to provide a greatly improved means which would not only have considerably longer life than means for applying the necessary force to cause the cutter to move in shearing engagement with a comb as used heretofore, and which would reduce friction and wear to a minimum, including improved lubricating means. It would, moreover, be desirable to provide such an improved arrangement which could be incorporated with little expense in handpieces now in extensive use, whereby such handpieces could be converted to the much more satisfactory handpieces embodying the present invention.

Accordingly, it is an object of of the present invention to provide an improved shearing handpiece having a much longer life with less wear on certain parts and less heating than was the case with shearing handpieces heretofore employed.

It is another object of the present invention to provide an improved shearing handpiece including improved means for applying force to the cutter to cause it to move in shearing engagement with the comb with the desired constant contact pressure throughout its cycle of movement.

Another object of the present invention resides in the provision of an improved arrangement in a shearing device for applying a force to the cutter biasing it into shearing engagement with the comb, commonly referred to as a tension pin and associated means, which can readily be incorporated in many shearing handpieces now on the market today by the mere replacement of a few simple parts.

It is a further object of the present invention to provide a handpiece incorporating improved means for eliminating the disadvantages referred to above, which is extremely flexible in use, has a much longer life than handpieces employed heretofore, and which gives satisfactory and foolproof operation through long years of service.

It is another object of the present invention to provide a tension pin having an unusually long life by substituting rolling friction for the sliding friction heretofore produced by the use of such pins.

Still a further object of the present invention resides in the provision of improved lubricating means for such tension pins to increase the useful life thereof.

Further objects and advantages of the present invention will become apparent as the following description proceeds, and the features of novelty which characterize the invention will be pointed out with particularity in the claims annexed to and forming a part of the present invention.

For a better understanding of the present invention, reference may be had to the accompanying drawings in which:

Fig. 1 is an elevational view, partly in section, of a shearing handpiece embodying the present invention;

Fig. 2 is an enlarged view of a portion of Fig. 1 illustrating specifically the improved force applying means of the present invention;

Fig. 3 is an exploded view, partly in section, of the parts of the present invention which are new and different from those disclosed in the above-mentioned copending Bartlett application and which may readily be incorporated in prior shearing handpieces to convert them to the more desirable shearing handpieces of the present invention;

Fig. 4 is an enlarged sectional view of a portion of Fig. 2 but taken substantially at right angles to the sectional view of Fig. 2 in order to aid in more clearly understanding the present invention; and Figs. 5, 6 and 7 are somewhat schematic diagrams to aid in illustrating the advantageous features and operation of the present invention.

The shearing handpiece of the present invention is in general substantially identical with that disclosed in the above-mentioned copending Bartlett application, except that it incorporates the improved force transmitting means of the present invention for applying the desired shearing force between the cutter and the comb, and maintaining this force constant at any desired setting throughout the cycle of movement of the cutter. The improved force transmitting means is designed to incorporate rolling friction as contrasted with sliding friction used heretofore, with greatly increased life, and a substantial reduction in heating, thereby resulting in an overall improved shearing handpiece.

The shearing handpiece of the present invention includes the same functional basic element of the copending Bartlett application, and particularly comprises a handle assembly 11, including a head 12, a comb 13, a cutter 14, a pivotally supported member or fork 16 for converting rotary motion of some prime mover not shown to oscillating or reciprocating movement of the cutter 14, and the improved means generally designated at 18 of the present invention for adjusting the force between the cutter 14 and the comb 13 which in the sheep shearing art is generally referred to as "tensioning means" even though actually compressive forces are involved. Long years of use of shearing handpieces have demonstrated the desirability of providing a shearing force between the cutter and the comb of between 45 and 50 pounds. The means 18 referred to above and described in much greater detail hereinafter must be such as to provide this force at all times throughout the cycle of movement of the cutter, and of course must permit adjustment to get the initial desired force and also to take care of wear between the cutter and the comb which requires periodic adjustment of this force.

The handle of the shearing handpiece 11 of the present invention is preferably identical with that disclosed and claimed in the copending Bartlett application referred to above. The head 12 comprises only a small portion of the overall length of the handpiece, which head is preferably a casting formed of aluminum or other light metal alloy thereby providing a much lighter handpiece than was the case with respect to handpieces formed of malleable iron as was generally the case. The handle portion is formed of relatively thin wall metal tubing designated at 20 which defines therein a chamber 21 leading into a corresponding hollow space within the head 12 for accommodating the working parts of the handpiece which form no part of the present invention. Preferably an intermediate portion of the tubing 20 is enlarged as indicated at 22 to provide the clearance for necessary operating parts contained therein and to provide a suitable gripping portion for the hand of the operator. The tubular portion 20 and the head 12 are fixedly related as by soldering or brazing. The handpiece 11 includes all the desirable features of balance and rigidity fully described and claimed in the above-mentioned copending Bartlett application. It will be understood that the light metal head 12 may require threaded openings to accommodate certain screws for assembly of parts, and threaded steel inserts may be cast into such head where this is necessary.

For the purpose of supporting the comb 13 in the conventional manner at the forward end of the hand piece 11, the head 12 is provided with an extending flange 24 defining a shoulder 25. The comb 13, which is provided with the conventional teeth associated with such combs, is fastened to this shoulder as by suitable screws 26. Preferably steel threaded inserts are cast within the head 12 to accommodate the screws 26. Consequently, the comb 13 may be rigidly secured to the head 12 in a manner so as to become an integral part thereof. The cutter 14 is also of conventional construction and is mounted in the usual fashion on the upper surface of the comb 13 for reciprocal movement thereacross. The cutter obviously is also provided with suitable teeth which in cooperation with the comb teeth provide the desired shearing action.

The cutter 14 must be oscillated or reciprocated relative to the comb 13 in order to produce cutting action, and any suitable source of power not shown for causing such movement of the cutter may be employed. It will be understood that such source of power is in the form of a prime mover of the rotary type, and obviously means must be provided to convert such rotary motion to oscillating motion of the cutter 14. The details of such means are fully disclosed in the above-mentioned Bartlett application and no further discussion is included herein except to describe the oscillating member or fork 16 which is pivotally mounted intermediate its ends in a conventional manner illustrated in the Bartlett application or in either of the above-mentioned Letters Patent of the United States. To support the member or fork 16 at an intermediate point in a pivotal manner, there is provided a pivot post 28 which is adapted to extend into the chamber 21 within the handpiece. Preferably the head 12 is provided on its underside with an aperture 27 of suitable size to receive the pivot post 28, which is illustrated as being provided with an integral annular flange 29. When the pivot post 28 is inserted within the aperture in the head 12, the annular flange 29 abuts against the bottom surface of the head 12. The pivot post 28 is preferably retained in fixed relationship with respect to the head 12 by means of the screws 30 extending through the annular flange 29 and threaded into the head 12. Preferably the pivot bearing for the member or fork 16 at its intermediate end is a spherical bearing of the type shown in the above-mentioned Brookes patent. To support such a spherical bearing designated at 31 in Fig. 1 of the drawings, the pivot post 28 is provided with a cavity 32 for engagement with the spherical bearing 31. Furthermore, the fork 16 is provided with a recess 33 for receiving therein the fork cup 34, which is provided with a curved recess 35 to engage the surface of the spherical bearing 31. Thus, pivot ball or spherical bearing 31 is disposed between the pivot post 28 on one side and the fork cup 34 on the opposite side. By using such a spherical bearing 31 long life of the pivot for the fork 16 is provided.

For the purpose of drivingly connecting the end of the fork 16 which protrudes from the front end of the handle assembly adjacent the cutter 14 to the cutter 14, this end of the fork 16 is provided with longitudinally extending recesses for receiving a pair of fork yokes 38, only one of which is visible in the drawings. These fork yokes are fully disclosed in the above-mentioned copending Bartlett application and Letters Patent of the United States, and are provided at their outer ends with depending conical projections 39 shaped to be received within suitable recesses in the upper surface of the cutter 14. The details of construction of this portion of the fork 16 and the fork yokes 38 form no part of the present invention. The parts of the shearing handpiece disposed within the chamber 21 are suitably lubricated by virtue of the fact that the chamber 21 is at least partially filled with lubricant. To prevent the entrance of dust and dirt at the front of chamber 21, it is closed by means of a flexible diaphragm 41 also fully disclosed in the copending Bartlett application.

With the arrangement described thus far, it is apparent that oscillation of the fork 16 about its pivot point will cause oscillating movement of the cutter 14 relative to the comb 13. Without more, however, sheep shearing would be impossible, since it is essential that a predetermined pressure of between 40 and 50 pounds exist between the comb 13 and the cutter 14 for satisfactory shearing operation. In order to supply this force, the improved tensioning means of the present invention are provided, which term "tensioning means" is really a misnomer but is employed in this application in view of its general use in the trade. Actually, the tensioning means 18 is a force transmitting means between a suitable support associated with the head 12 and the fork 16. As is clearly shown in Figs. 1 and 2 of the drawings, the fork 16 is provided at its forward end with a bearing socket 44 for receiving therein the rounded lower end of a force transmitting pin 45 referred to hereinafter as a tension pin 45. The present invention is primarily concerned with the construction, particularly of the upper end of the tension pin 45 as viewed in Figs. 1 and 2 of the drawings, and the parts of the shearing handpiece associated with the upper end.

For the purpose of accommodating the tensioning means of the present invention, the shearing handpiece head 12 is provided in a conventional manner at its upper end with an integral inclined sleeve 47 forming a part of the head 12. This sleeve is inclined at an angle corresponding with the angle of inclination of the tension pin 45. The preferred angle of inclination is identical with that disclosed and claimed in the copending Bartlett application. As set forth in the copending Bartlett application, the sleeve 47 and the tension pin 45 are preferably inclined at an angle with respect to the longitudinal axis of the handle assembly 11 of less than 50 degrees, thus permitting the bearing socket 44 in the fork 16 to be positioned much closer to the cutter 14 than to the pivot post 28, with the result that a greater component of force is applied to the cutter where it performs a useful function, and a lesser component of force is applied to the bearing post 28 where it only causes wear. Preferably the sleeve 47 is identical with that disclosed in the copending Bartlett application, and is interiorly threaded as illustrated to accommodate a tension nut screw bushing 50, which tension nut screw bushing is of the configuration shown best in Fig. 2 of the drawings, and of a size to receive therein the tension nut cup 51. Preferably the tension nut cup 51 is slidably received within the tension nut screw bushing 50. The bushing 50 is provided with an annular flange 50a at its intermediate portion which is adapted to rest against the upper annular surface of the sleeve 47. Moreover, the upper portion of the bushing 50 is threaded so as to receive in threaded engagement therewith the tension nut 52. This tension nut 52 is provided with a pin 53 having a flat end surface 54 disposed inside the tension nut 52 (which latter is of cup-shaped configuration), shaped to abut against the tension nut cup 51 so that by adjusting the position of the tension nut 52 relative to the bushing 50 the force applied to the tension pin 45 may be varied in any desired manner.

It will be understood that the oscillation of the cutter 14 will require swinging movement of the lower end of the tension pin 45 about a pivot at the upper end thereof which is in the vicinity of the tension nut cup 51. In accordance with the present invention, the upper end of the tension pin 45 is designed so as to permit with suitable means forming a part of the present invention only rolling friction, thereby greatly reducing wear and the production of heat as contrasted with prior art devices. In accordance with the present invention, there is disposed within the tension nut cup 51 a tension pin bearing 56 having at its upper end, as viewed in Fig. 2 of the drawings, a narrow neck portion 56a engageable with the interior upper wall of the tension nut cup and a lower end defining a spherical surface 56b engageable with a cooperating spherical surface 58 defined at the upper end of the tension pin 45. Oscillation of the lower end of the tension pin 45 will cause rolling movement between the spherical surfaces 56b and 58, as clearly obvious from a comparison of Fig. 2 and Fig. 4 of the drawings.

In order to hold the spherical bearing surface 58 of the tension pin 45 in engagement with the tension pin bearing 56, and more particularly in engagement with the cooperating spherical bearing surface 56b of the tension pin bearing 56, and for the further purpose of defining a lubricant reservoir, there is provided a diaphragm 60 having an enlarged opening at one end and a smaller opening at the other end. Preferably at the enlarged end of the diaphragm 60, as best shown in Figs. 2 and 4 of the drawings, there is provided a lateral flange 61 capable of being disposed within an annular recess 62 defined in the periphery of the tension nut cup 51 adjacent the lower end thereof. Preferably the diameter of the flange 61 is less than the diameter of the bottom of the recess 62 so that the diaphragm 60 tends to remain assembled with the tension nut cup 51. At the smaller open end of the diaphragm 60 there is again defined a sort of flange-like member 63 capable of being received within an annular recess 64 defined around the periphery of the tension pin 45 adjacent the upper end thereof. Again, the diaphragm 60 is designed so that the flange portion 63 tends to remain firmly seated within the recess 64, thus maintaining the elements 45, 51 and 56 in assembled relationship. Moreover, a chamber 67 is defined within the diaphragm 60 for lubricant which will insure lubrication of the spherical bearing surfaces 56b and 58.

In order to supply lubricant to the reservoir 67 from the space 68 defined within the tension nut 52, where it is normally placed, the tension nut cup 51 is provided with lubricant passageway 69 which leads to the annular chamber 70 defined around the narrow neck portion 56a of the tension pin bearing 56. Additionally, the tension pin bearing 56 is provided with a longitudinally extending channel 71 for interconnecting the reservoirs 67 and 70. It will be understood that the channel or oil groove 71 will not always be in alignment with the lubricant passageway 69, two different positions of the tension pin bearing 56 being shown in Figs. 2 and 4, respectively, since the tension pin bearing 56 is free to rotate about its own longitudinal axis. However the annular reservoir 70 will form a ready connection between the lubricant passageways 69 and 71. It will be understood that the diaphragm 60 will be formed of resilient material which will not be damaged by contact with lubricant, and preferably is made from a buna-N synthetic rubber.

The arrangement described insofar as the tension pin 45, the tension nut cup 51, the tension pin bearing 56, and the diaphragm 60 are concerned, is such that these elements may replace the corresponding elements of all shearing handpieces of the construction shown in the above-mentioned Bartlett application of which there are a great many in use today, thus permitting the advantages of the present invention to be applied not only to new shearing handpieces but to those already in use by merely replacing the corresponding parts of Bartlett et al. with the four elements shown in the exploded view in Fig. 3 of the drawings.

In order to provide an arrangement which can be used for converting prior art handpieces into handpieces embodying the present invention, certain design limitations are imposed which, however, are not limitations as far as the present invention is concerned. It should be understood that the spherical bearing surfaces are really arcuate convex surfaces one of which is on the upper end of the tension pin 45, and the other of which might even be an integral part of the head 12 or a part of elements 51, 52, or the like. In an arrangement built and successfully tested which can be incorporated in new shearing handpieces as well as the shearing handpiece of the copending Bartlett application, the radius of curvature of the spherical bearing surface 58 was 2½ inches, while the radius of curvature of the spherical surface 56b was ½ inch. This particular combination of spherical bearing surfaces produced a pressure of 172,000 pounds per square inch at the adjacent engaging portions of the spherical surfaces when a load of 130 pounds was transmitted along tension pin 45. Moreover, this pressure remained constant even in the extreme positions of the bearing pin 45 as indicated in Fig. 4 of the drawings. It will be apparent that if the radius of one of the spherical bearing surfaces 56b or 58 is made too small, an excessive bearing surface stress might be imposed due to the very small area of contact between these spherical bearing surfaces. Of course, it is also essential that the tension pin 45 clear the inner wall of the tension nut cup 51 when in the extreme position viewed in Fig. 4 of the drawings, and preferably the open lower end of the tension nut cup is chamfered as indicated at 75 to afford additional clearance. It should be understood, however, that if it were not desirable to incorporate the features of the present invention in prior art shearing handpieces certain limitations required for such incorporation in prior handpieces could be dispensed with, and it is contemplated in the appended claims to cover the present invention in its broader aspects not limited to an arrangement which will work in new handpieces as well as handpieces constructed heretofore.

In order to aid in understanding the features of the present invention, reference may be had to Figs. 5, 6 and 7 of the drawings. First of all, it will be understood that in order to produce a constant force between the comb 13 and the cutter 14, the distance between the tension pin socket 44 and the surface against which the upper end of the tension pin 45 reacts must remain constant. Furthermore, to eliminate sliding friction, a rounded bearing surface, or in other words a spherical bearing surface 58, must be provided at the upper end of the tension pin 45 which can be rolled against another arcuate or spherical bearing surface such as 56b. This could be accomplished by the provision of a ball bearing like element such as 72 pivoted at P and shown in Fig. 7 of the drawings within the tension nut cup 51 to roll against an upper rounded end of a tension pin 45' resulting in rolling friction at the point C. From an inspection of Fig. 7, however, it will be apparent that the desired constant force between the cutter 14 and the comb 13 will not be maintained unless the distance between the pivot point P of Fig. 7 and the bearing socket 44 in the fork 16 will remain constant whether the socket 44 is in its center position or one of its extreme positions. If one used the arrangement shown in Fig. 7 without paying any attention to the radii of the bearing surfaces engageable at C, it will be apparent that as the tension pin 45 moves to one side so that its surface, say at point X, engages the ball 72, the distance between pivot point P and the socket 44 might vary due to the particular choice of radii for the spherical bearing surfaces engaging at C, thus causing a variable tension which is obviously undesirable. It is essential that the distance from the pivot point P of bearing 72 to the socket 44 remain constant at all times. It will be appreciated that if two spherical balls such as A and B shown in Fig. 5 are placed with their spherical surfaces in contact, no matter what position these balls assume the sum of their radii measured through the point of contact C on their surfaces will be equal to a constant. In other words $$R + r = K$$

where K is a constant. It will be apparent that since only a relatively small rolling movement between the balls A and B is required in the device of the present invention, it is not necessary to use all of the balls but merely enough to provide a sufficient bearing surface which will accommodate the maximum oscillating movement of the tension pin 45.

In Fig. 6 of the drawings there is superimposed on the balls A and B the tension pin socket 44, the tension pin 45, and the tension pin bearing 56, to illustrate the portions of the spherical surfaces of the balls A and B required. Thus, the spherical bearing surface 58 of the tension pin 45 is a surface section of a sphere having a radius R, and the corresponding bearing surface 56b of the tension pin bearing 56 is also a surface section of a sphere having a radius r. The sum of these radii equals the constant K, which is the distance between the socket 44 for the tension pin 45, and the pivot point P. In Fig. 6 the spherical bearing 31 for the fork 16 has been indicated which is directly below the effective pivot point P of the tension pin bearing 56. The angle between the tension pin 45 and the line Y interconnecting the socket 44 and the spherical bearing 31 is preferably less than 50 degrees, and in one embodiment built in accordance with the present invention comprised an angle of 48 degrees. The radius R may vary and, consequently, also the radius r, but the choice of these radii should be such that the distance between P and 44 remains constant and, furthermore, that the radius of the smallest sphere does not become so small that the surface pressure at the contact C becomes excessive. It would be desirable to keep the stress at the bearing surface well below 500,000 pounds per square inch.

In view of the detailed description included above, the operation of the shearing handpiece 11 of the present invention will readily be understood by those skilled in the art, and no further discussion is included herein. By virtue of the improved tensioning means described, rolling friction at the upper end of the tension pin is substituted for the sliding friction heretofore employed. Extensive tests on one embodiment of the present invention indicated that the temperature rise over a long period of time is less by some 20° F. than prior art devices. Moreover, a much more satisfactory operation has been obtained. Excess tension can be applied with satisfactory operation, which is often done in sheep shearing contests where competition is very keen and the operators can't even afford to take off time to oil the shearing handpieces.

While there has been illustrated and described a particular embodiment of the present invention, it will be understood that various changes and modifications will readily suggest themselves to those skilled in the art, and it is aimed in the appended claims to cover all such changes and modifications as fall within the true spirit and scope of the present invention.

What is claimed as new and desired to be secured by Letters Patent of the United States is:

1. In a shearing handpiece, the combination of a handle assembly, a comb mounted on said handle assembly, cutter means movable back and forth across said comb, a fixed extension on said handle assembly disposed in spaced relation to said cutter means, an elongated rodlike force transmitting member pivotally mounted at one end on said cutter means and having its opposite end disposed adjacent said fixed extension, the upper end of said force transmitting member providing a convex spherical surface, an elongated rodlike bearing member disposed between said fixed extension and said force transmitting member and having a convex spherical surface at one end engageable with the upper end of said force transmitting member, and adjustable means mounted on said sleeve for varying the force between said cutter means and said comb transmitted through said interengaging spherical surfaces.

2. The combination recited in claim 1 wherein said rod like force transmitting element is at least twice as long as said rod like bearing member.

3. In a shearing handpiece, the combination of a handle assembly, a comb mounted on said handle assembly, cutter means movable back and forth across said comb, an inclined sleeve portion on said handle assembly disposed in spaced relation to said cutter means, a first elongated force transmitting member pivotally mounted at one end on said cutter means and having its opposite end disposed within said sleeve, the upper end of said first force transmitting member comprising a convex spherical surface, a cup-shaped member slidably mounted within said sleeve and receiving therein the upper end of said first force transmitting member, a second elongated force transmitting member wholly disposed within said cup-shaped member and having at its lower end another convex spherical surface engageable with the upper end of said first force transmitting member, means for holding said cup-shaped member and both said first and second force transmitting members in assembled relationship and simultaneously defining an oil reservoir for lubricating said spherical bearing surfaces where substantially only rolling friction occurs, and adjustable means on said sleeve engageable with said cup-shaped member to control and vary the force transmitted through said force transmitting members to said cutter means.

4. In a shearing handpiece, the combination of a support, a comb mounted on said suport, a cutter movable between preselected positions slidably related to said comb, means for oscillating said cutter between said positions including a member having one end drivingly connected to said cutter, a fixed extension on said support, means interposed between said fixed extension and said member for urging said cutter into shearing engagement with said comb, said last mentioned means comprising two elongated force transmitting elements having adjacent ends provided with convex spherical interengaging surfaces, and flexible means connected to one of said elements for maintaining said spherical surfaces in engagement.

5. In a shearing handpiece, the combination of a support, a comb mounted on said support, a cutter movable between preselected positions slidably related to said comb, means for oscillating said cutter between said positions including a member having one end drivingly connected to said cutter, a fixed extension on said support, means interposed between said fixed extension and said member for urging said cutter into shearing engagement with said comb, said last mentioned means comprising two elongated force transmitting elements having adjacent ends provided with convex spherical interengaging surfaces and a cup-shaped member for receiving therein at least part of each of said elements including said spherical surfaces, and a diaphragm having means engageable with said cup-shaped member and one of said elements to define with said cup-shaped member a lubricant chamber housing said surfaces, said diaphragm holding said cup-shaped member and said two elements in assembled relationship.

References Cited in the file of this patent

UNITED STATES PATENTS

| 799,107 | Stewart | Sept. 12, 1905 |
| 1,788,547 | Shaler | Jan. 13, 1931 |
| 2,296,236 | Musolf | Sept. 15, 1942 |
| 2,651,107 | Bartlett | Sept. 8, 1953 |

FOREIGN PATENTS

| 13,352/95 | Great Britain | Sept. 28, 1895 |